(12) United States Patent
Zuo et al.

(10) Patent No.: US 10,739,914 B1
(45) Date of Patent: Aug. 11, 2020

(54) TOUCH SENSING METHOD AND APPARATUS OF SAME

(71) Applicant: WUHAN CHINA STAR OPTOELECTRONICS TECHNOLOGY CO., LTD., Wuhan (CN)

(72) Inventors: Qingcheng Zuo, Wuhan (CN); Xiaoling Yuan, Wuhan (CN)

(*) Notice: Subject to any disclaimer, the term of this patent is extended or adjusted under 35 U.S.C. 154(b) by 0 days.

(21) Appl. No.: 16/331,986

(22) PCT Filed: Sep. 4, 2018

(86) PCT No.: PCT/CN2018/103981
§ 371 (c)(1),
(2) Date: Mar. 11, 2019

(87) PCT Pub. No.: WO2020/034268
PCT Pub. Date: Feb. 20, 2020

(30) Foreign Application Priority Data

Aug. 17, 2018 (CN) .......................... 2018 1 0938355

(51) Int. Cl.
*G06F 3/041* (2006.01)
*G02F 1/1333* (2006.01)
*G06F 3/044* (2006.01)

(52) U.S. Cl.
CPC ........ *G06F 3/0418* (2013.01); *G02F 1/13338* (2013.01); *G06F 3/044* (2013.01)

(58) Field of Classification Search
CPC ........ G06F 3/041; G06F 3/0418; G06F 3/044; G06F 3/04886; G02F 1/1333; G02F 1/13338
See application file for complete search history.

(56) References Cited

U.S. PATENT DOCUMENTS

| | | | |
|---|---|---|---|
| 2001/0023635 A1 | 9/2001 | Taruguchi | |
| 2013/0207913 A1* | 8/2013 | Takashima | G06F 3/0418 345/173 |
| 2015/0070301 A1* | 3/2015 | Chia | G06K 9/0002 345/174 |
| 2015/0338954 A1 | 11/2015 | Yang et al. | |
| 2015/0346903 A1* | 12/2015 | O'Connor | G09G 5/18 345/173 |
| 2018/0173923 A1* | 6/2018 | Lee | G06F 3/0412 |

(Continued)

FOREIGN PATENT DOCUMENTS

| CN | 102411441 A | 4/2012 |
|---|---|---|
| CN | 104020878 A | 9/2014 |

(Continued)

*Primary Examiner* — Joe H Cheng

(57) ABSTRACT

The present disclosure provides a touch sensing method, including receiving a touch sensing signal of a touch sensing panel; determining a type of a touch sensing operation according to the touch sensing signal and generating a determining result; determining a position of a non-fingerprint touch sensing operation according to a position generated using the touch sensing signal when the determining result indicates that the type of the touch sensing operation is not a fingerprint touch sensing operation; and suspending processing of the touch sensing signal generated of a portion of the touch sensing panel corresponding to the position of the non-fingerprint touch sensing operation.

10 Claims, 8 Drawing Sheets

(56) References Cited

U.S. PATENT DOCUMENTS

2018/0348949 A1* 12/2018 Kim .................. G06F 3/0418
2018/0349669 A1* 12/2018 Kim .................... G06K 9/22

FOREIGN PATENT DOCUMENTS

| CN | 105824559 A | 8/2016 |
| CN | 106843588 A | 6/2017 |
| CN | 107544711 A | 1/2018 |

* cited by examiner

TOUCH SENSING METHOD AND APPARATUS OF SAME

This application is a national stage of PCT/CN2018/103981, filed on Sep. 4, 2018, which claims priority to Chinese Patent Application No. 201810938355.3, filed on Aug. 17, 2018, and entitled "TOUCH SENSING METHOD AND APPARATUS OF SAME". The entire disclosures of the above applications are incorporated herein by reference.

FIELD OF INVENTION

The present disclosure relates to the field of liquid crystal display (LCD) technologies, and more particularly to a touch sensing method and a device of same.

DESCRIPTION OF PRIOR ART

Following the development of display technologies, users have higher and higher appearance requirements for liquid crystal display (LCD) panels. In order to pursue an extreme display experience, every LCD panel manufacturer is dedicated to developing LCDs with extremely narrow frame edges. Diminishing width of a frame edge of an LCD at utmost and increasing a display to body ratio have been became popular research topics. Full screen panel technologies and fingerprint sensing technologies have arisen accordingly.

In conventional LCD panels, a general design for a structure of touch sensing electrodes of touch panel (TP) is an N (in horizontal direction) plus M (in vertical direction) (N×M) matrix structure, that is N rows×M columns. During operation of LCD panel, an integrated circuit (IC, driving device) drives the touch panel according to a predetermined procedure, then an electrical signal generated from the touch sensing electrode is transformed into a touch position data. The touch panel is driven according to a row and column scanning method complied with the matrix structure of the touch sensing electrodes when the IC drives the touch panel.

However, false manipulations occur very easily on a full screen handheld device with an extremely high display to body ratio.

SUMMARY OF INVENTION

In order to resolve the above problem, the present disclosure provides a technical solution as following. A touch sensing method includes:
step of S10: receiving a touch sensing signal of a touch sensing panel;
step of S20: determining a type of a touch sensing operation according to the touch sensing signal and generating a determining result;
step of S30: determining a position of a non-fingerprint touch sensing operation according to a position generated using the touch sensing signal when the determining result indicates that the type of the touch sensing operation is not a fingerprint touch sensing operation; and
step of S40: suspending processing of the touch sensing signal generated of a portion of the touch sensing panel corresponding to the position of the non-fingerprint touch sensing operation.

According to one of the embodiments of the present invention, the step of S40 includes:
step of S41: stopping driving of at least a column of first touch sensing electrodes corresponding to a boundary area when the position of non-fingerprint touch sensing operation is located at a left boundary or/and a right boundary of the touch sensing panel; and
step of S42: stopping driving of at least a row of second touch sensing electrodes corresponding to the boundary area when the position of non-fingerprint touch sensing operation is located at an upper boundary or/and a bottom boundary of the touch sensing panel.

According to one of the embodiments of the present invention, the step of S40 includes:
step of S41: processing a first touch sensing signal of the at least a column of first touch sensing electrodes corresponding to the boundary area as a touch sensing signal of the first touch sensing electrodes generated using a non-touching condition thereof when the position of non-fingerprint touch sensing operation is located at the left boundary or/and the right boundary of the touch sensing panel; and
step of S42: processing a second touch sensing signal of the at least a row of second touch sensing electrodes corresponding to the boundary area as a touch sensing signal of the second touch sensing electrodes generated using a non-touching condition thereof when the position of non-fingerprint touch sensing operation is located at the upper boundary or/and the bottom boundary of the touch sensing panel.

According to one of the embodiments of the present invention, the step of S40 includes:
step of S41: stopping driving of third touch sensing electrodes of an irregular area corresponding to the position of non-fingerprint touch sensing operation; and
step of S42: processing a third touch sensing signal of the third touch sensing electrodes of the irregular area corresponding to the position of non-fingerprint touch sensing operation as a touch sensing signal of the third touch sensing electrodes generated using a non-touching operation thereof.

According to one of the embodiments of the present invention, after the step of S20, the touch sensing method further includes:
step of S50: obtaining a position coordinate of the touch sensing operation when the determining result indicates that the type of the touch sensing operation is a fingerprint touch sensing operation; and
step of S60: driving touch sensing electrodes corresponding to the position coordinate.

The present disclosure further provides a touch sensing apparatus including: a receiving device configured to receive a touch sensing signal of a touch sensing panel; a determining device configured to determine a type of a touch sensing operation and generate a determining result; a locating device configured to recognize a position of a non-fingerprint touch sensing operation according to a position generated using the touch sensing signal when the determining result indicates that the type of the touch sensing operation is not a fingerprint touch sensing operation; and a driving device configured to suspend processing of the touch sensing signal generated of a portion of the touch sensing panel corresponding to the position of the non-fingerprint touch sensing operation.

According to one of the embodiments of the present invention, the driving device is further configured to:
stop driving of at least a column of first touch sensing electrodes corresponding to a boundary area when the position of the non-fingerprint touch sensing operation is located at a left boundary or/and a right boundary of the touch sensing panel; or
stop driving of at least a row of second touch sensing electrodes corresponding to the boundary area when the position of the non-fingerprint touch sensing operation is located at an upper boundary or/and a bottom boundary of the touch sensing panel.

According to one of the embodiments of the present invention, the driving device is further configured to: process a first touch sensing signal of the at least a column of first touch sensing electrodes corresponding to the boundary area as a touch sensing signal of the first touch sensing electrodes generated using a non-touching condition thereof when the position of the non-fingerprint touch sensing operation is located at the left boundary or/and the right boundary of the touch sensing panel; or
process a second touch sensing signal of the at least a row of second touch sensing electrodes corresponding to the boundary area as a touch sensing signal of the second touch sensing electrodes generated using the non-touching condition thereof when the position of non-fingerprint touch sensing operation is located at the upper boundary or/and the bottom boundary of the touch sensing panel.

According to one of the embodiments of the present invention, the driving device is further configured to: stop driving of third touch sensing electrodes of an irregular area corresponding to the position of non-fingerprint touch sensing operation; or
process a third touch sensing signal of the third touch sensing electrodes of the irregular area corresponding to the position of non-fingerprint touch sensing operation as a touch sensing signal of the third touch sensing electrodes generated using a non-touching operation thereof.

According to one of the embodiments of the present invention, the locating device is further configured to: obtain a position coordinate of the touch sensing operation when the determining result indicates that the type of the touch sensing operation is a fingerprint touch sensing operation; and
drive touch sensing electrodes corresponding to the position coordinate using the driving device.

The present disclosure has the following advantages. When false manipulations are detected according to the detection of fingerprint recognition inside the touch sensing panel, the driving of touch sensing panel of non-fingerprint touch sensing operation is stopped or the internal data of driving device is modified to equivalent to non-touching operation of touch sensing panel corresponding to the position of non-fingerprint touch sensing. Therefore, false manipulations can be prevented and user experience can be improved without affecting the actually manipulating effect.

BRIEF DESCRIPTION OF DRAWINGS

In order to illustrate the technical solutions of the embodiments of the present disclosure more clearly, following detailed description and drawings with reference to the exemplary embodiments of the present disclosure are concisely described below. Apparently, the specific embodiments described herein are only some examples of the present disclosure. Based on the following drawings, person who skilled in the art may obtain further drawings without making inventive effort.

Notations of drawings: 10, stop driving area; 20, normal driving area.

DETAILED DESCRIPTION OF INVENTION

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In following drawing, a same reference number denotes a same element or a similar element with same or similar structure.

The present disclosure is used for touch sensing apparatuses, false manipulations occur easily when a user hold a touch sensing apparatus in hand. The embodiments of the present disclosure can be used to resolve this problem. It should be noted that the touch sensing apparatus of the present disclosure is a mobile phone or a tablet computer.

Figure 1:
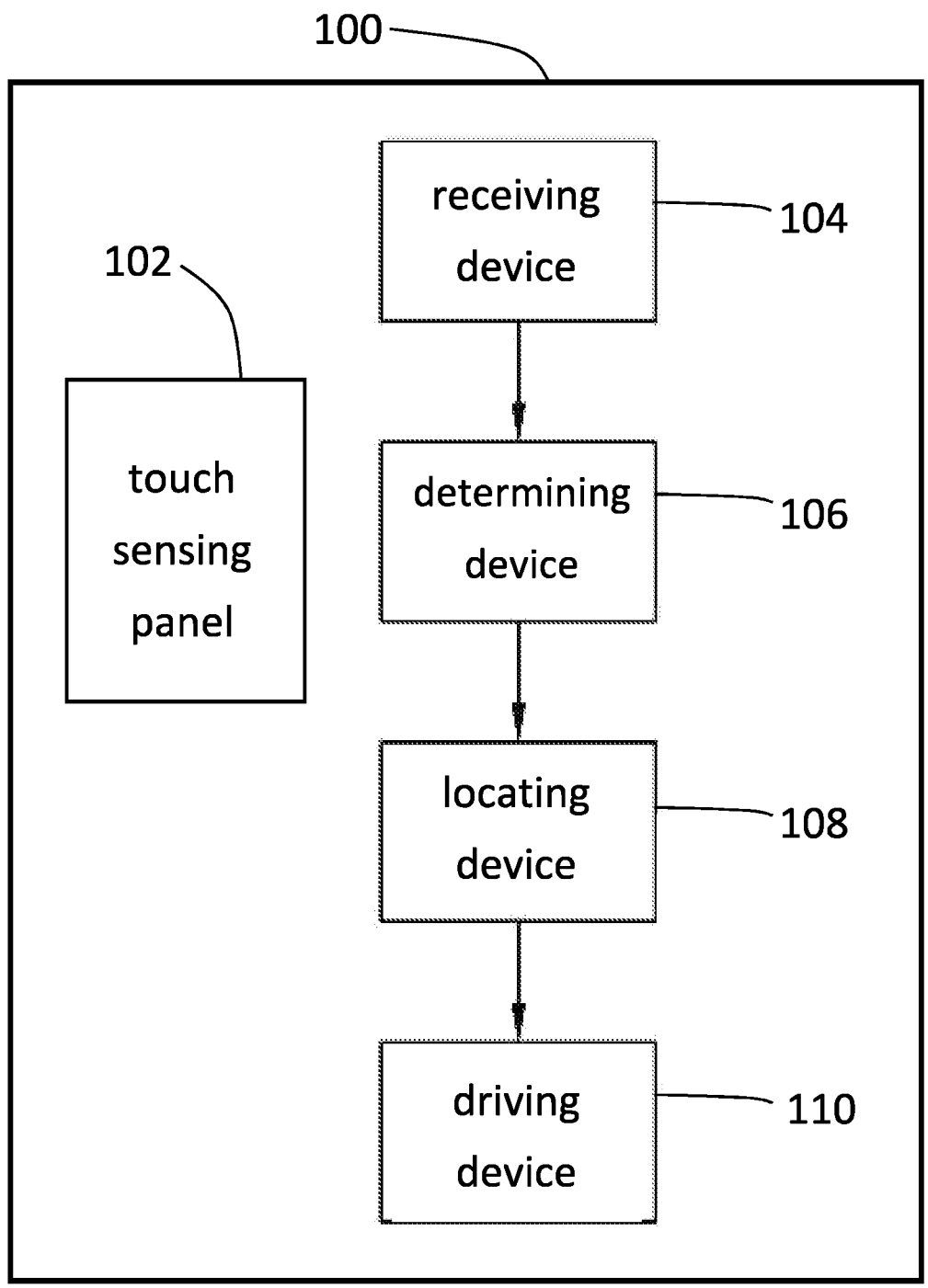
FIG. 1 is a block diagram of an embodiment of touch sensing apparatus of the present disclosure.
Figure 2:
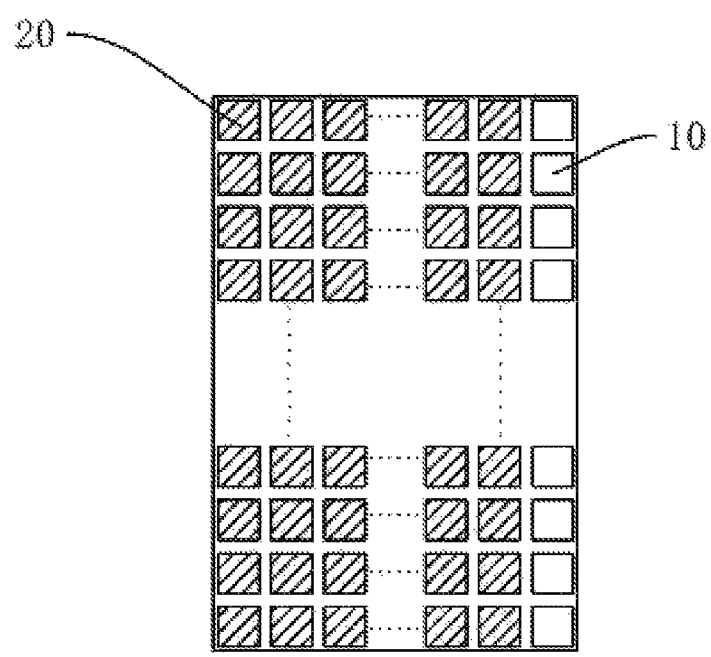
FIG. 2 is a schematic view of a driving embodiment of the present disclosure when a touch sensing electrode of non-fingerprint touch sensing operation is detected at a right boundary of the touch sensing panel.

A touch sensing apparatus is shown in FIG. 1, the touch sensing apparatus 100 includes: a touch sensing panel 102, a receiving device 104 configured to receive a touch sensing signal of the touch sensing panel 102; a determining device 106 configured to determine a type of a touch sensing operation and generate a determining result; a locating device 108 configured to recognize a position of a non-fingerprint touch sensing operation according to a position generated using the touch sensing signal when the determining result indicates that the type of the touch sensing operation is not a fingerprint touch sensing operation; and a driving device 110 configured to suspend processing of the touch sensing signal generated of a portion of the touch sensing panel 102 corresponding to the position of the non-fingerprint touch sensing operation.

The determining device 106 of the touch sensing panel 102 is configured to determine the type of touch sensing operation. The driving device 110 suspends processing of the touch sensing signal generated of a portion of the touch sensing panel 102 corresponding to the position of the non-fingerprint touch sensing operation when the locating device 108 recognizes the position of the non-fingerprint touch sensing operation if the determining result indicates that the type of the touch sensing operation is not a fingerprint touch sensing operation. Therefore, false manipulations can be prevented and user experience can be improved without affecting the actually manipulating effect.

The conventional full screen panel, as described in the background, a general design for a structure of touch sensing electrodes of touch panel is an N (in horizontal direction) plus M (in vertical direction) (N×M) matrix structure, that is N rows×M columns. During operation of the full screen panel, a driving device drives the touch panel according to a predetermined procedure, then a touch sensing signal generated from the touch sensing electrodes is transformed into a touch position data. The driving device drives the touch panel according to a row and column scanning method complied with the matrix structure of the touch sensing electrodes. It should be noted that an exemplary touch sensing electrodes of the present disclosure is implemented as an 18×36 matrix structure for driving.

An exemplary embodiment of the present disclosure is shown in FIG. 2 to FIG. 5. The driving device 110 is further configured to stop driving of at least a column of first touch sensing electrodes corresponding to a boundary area when the position of non-fingerprint touch sensing operation is located at a left boundary or/and a right boundary of the touch sensing panel, or stop driving of at least a row of second touch sensing electrodes corresponding to the boundary area when the position of non-fingerprint touch sensing operation is located at an upper boundary or/and a bottom boundary of the touch sensing panel.

In actual manipulating scenes, it should be noted that false manipulations often occur at left or right boundaries when a user holds and operates the touch sensing apparatus along a left/right (landscape) direction, and false manipulations often occur at upper or bottom boundaries when a user holds and operates the touch sensing apparatus along an upper/bottom (portrait) direction.

Figure 3:
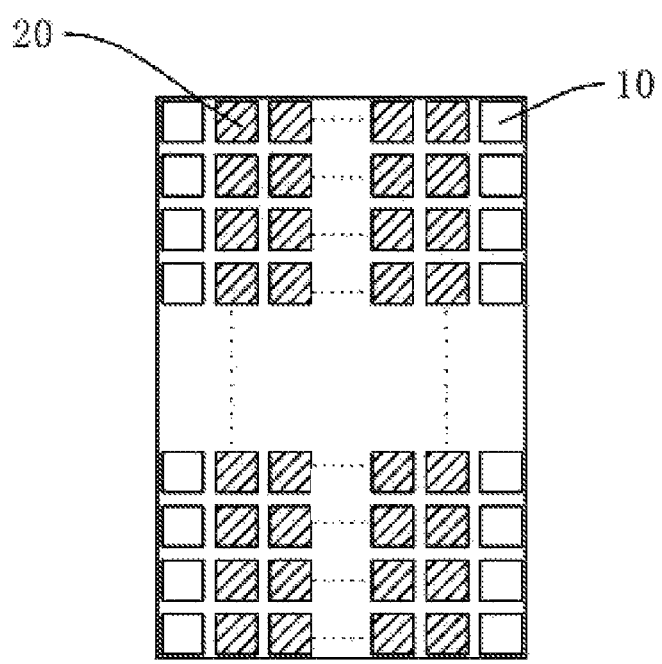
FIG. 3 is a schematic view of a driving embodiment of the present disclosure when a touch sensing electrode of non-fingerprint touch sensing operation is detected at both a left and a right boundaries of the touch sensing panel.
Figure 4:
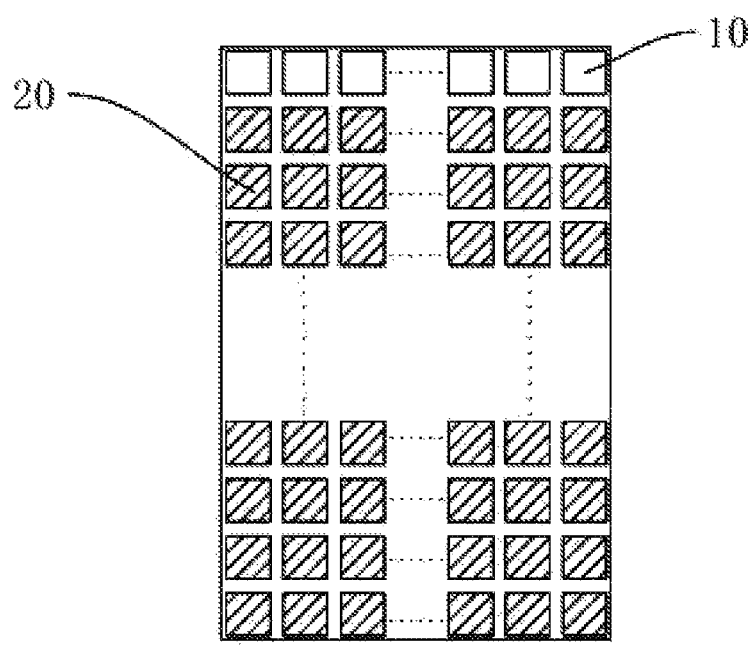
FIG. 4 is a schematic view of a driving embodiment of the present disclosure when a touch sensing electrode of non-fingerprint touch sensing operation is detected at an upper boundary of the touch sensing panel.
Figure 5:
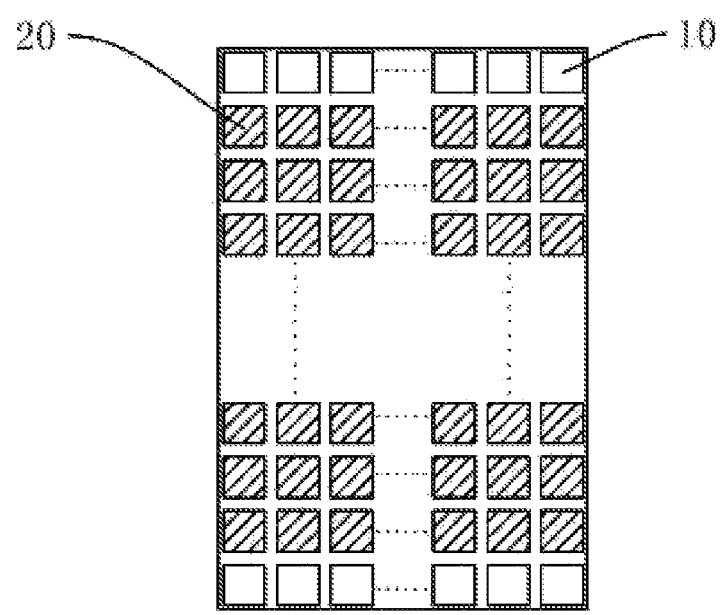
FIG. 5 is a schematic view of a driving embodiment of the present disclosure when a touch sensing electrode of non-fingerprint touch sensing operation is detected at both an upper and a bottom boundaries of the touch sensing panel.
Figure 6:
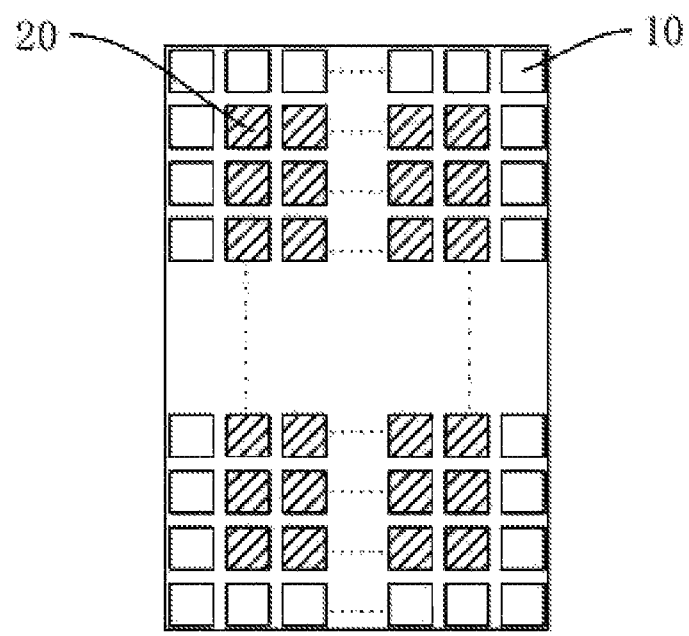
FIG. 6 is a schematic view of a driving embodiment of the present disclosure when a touch sensing electrode of non-fingerprint touch sensing operation is detected at both an upper, a bottom, a left, and a right boundaries of the touch sensing panel.

Referring to FIG. 3, the driving scheme of touch sensing panel is adjusted as a 16×36 matrix when a non-fingerprint touch sensing operation is detected at the left/right boundaries. Referring to FIG. 5, the driving scheme of touch sensing panel is adjusted as an 18×34 matrix when a non-fingerprint touch sensing operation is detected at the upper/bottom boundaries. As shown in FIG. 6, the driving device 110 stops driving of at least a row and a column of touch sensing electrodes corresponding to the upper, the bottom, the left, and the right boundary areas when the position of non-fingerprint touch sensing operation is located at the upper, the bottom, the left, and the right boundaries of a full screen panel. The driving scheme of touch sensing panel is adjusted as a 16×34 matrix when a non-fingerprint touch sensing operation is detected at the upper, the bottom, the left, and the right boundaries.

Figure 7:
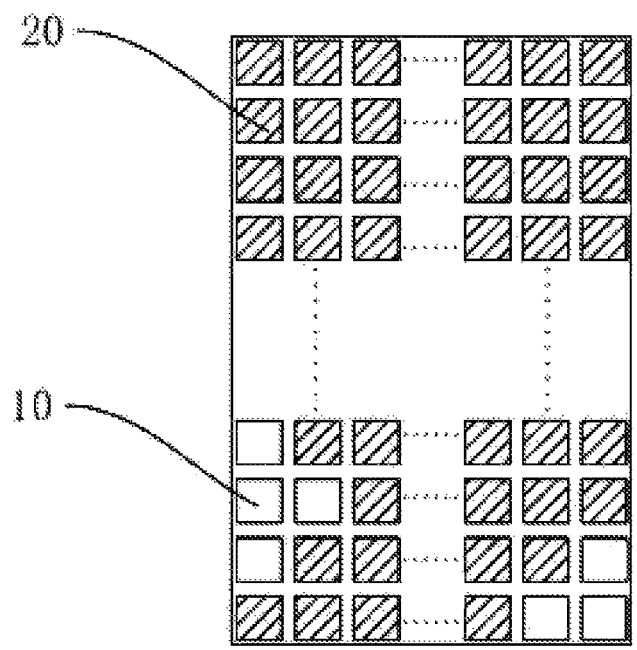
FIG. 7 is a schematic view of a driving embodiment of the present disclosure when a touch sensing electrode of non-fingerprint touch sensing operation is detected at an irregular area of the touch sensing panel.

As shown in FIG. 7, driving of third touch sensing electrodes of an irregular area corresponding to the position of non-fingerprint touch sensing operation is stopped when a non-fingerprint touch sensing operation is detected on the touch sensing panel. It should be noted that rows and columns of the touch sensing panel not stopped which are driven using the driving device 110 according to an original setting frequency.

In another exemplary embodiment of the present disclosure, the driving device 110 is further configured to process a first touch sensing signal of the at least a column of first touch sensing electrodes corresponding to the boundary area as a touch sensing signal of the first touch sensing electrodes generated using a non-touching condition thereof when the position of the non-fingerprint touch sensing operation is located at the left boundary or/and the right boundary of the touch sensing panel, or process a second touch sensing signal of the at least a row of second touch sensing electrodes corresponding to the boundary area as a touch sensing signal of the second touch sensing electrodes generated using the non-touching condition thereof when the position of non-fingerprint touch sensing operation is located at the upper boundary or/and the bottom boundary of the touch sensing panel.

A third touch sensing signal of the third touch sensing electrodes of the irregular area corresponding to the position of non-fingerprint touch sensing operation is processed as a touch sensing signal of the third touch sensing electrodes generated using a non-touching operation thereof when a non-fingerprint touch sensing operation is detected on the touch sensing panel.

Specifically, the internal data of the driving device 110 is modified to equivalent to non-touching operation of at least a column of the first touch sensing electrodes corresponding to the boundaries when a non-fingerprint touch sensing operation is detected at the left boundary or/and the right boundary of touch sensing panel 102.

Specifically, the internal data of the driving device 110 is modified to equivalent to non-touching operation of at least a row of the second touch sensing electrodes corresponding to the boundaries when a non-fingerprint touch sensing operation is detected at the upper boundary or/and the bottom boundary of touch sensing panel 102.

Furthermore, the locating device 108 is further configured to obtain a position coordinate of the touch sensing operation when the determining result indicates that the type of the touch sensing operation is a fingerprint touch sensing operation, and drive touch sensing electrodes corresponding to the position coordinate using the driving device 110.

Figure 8:
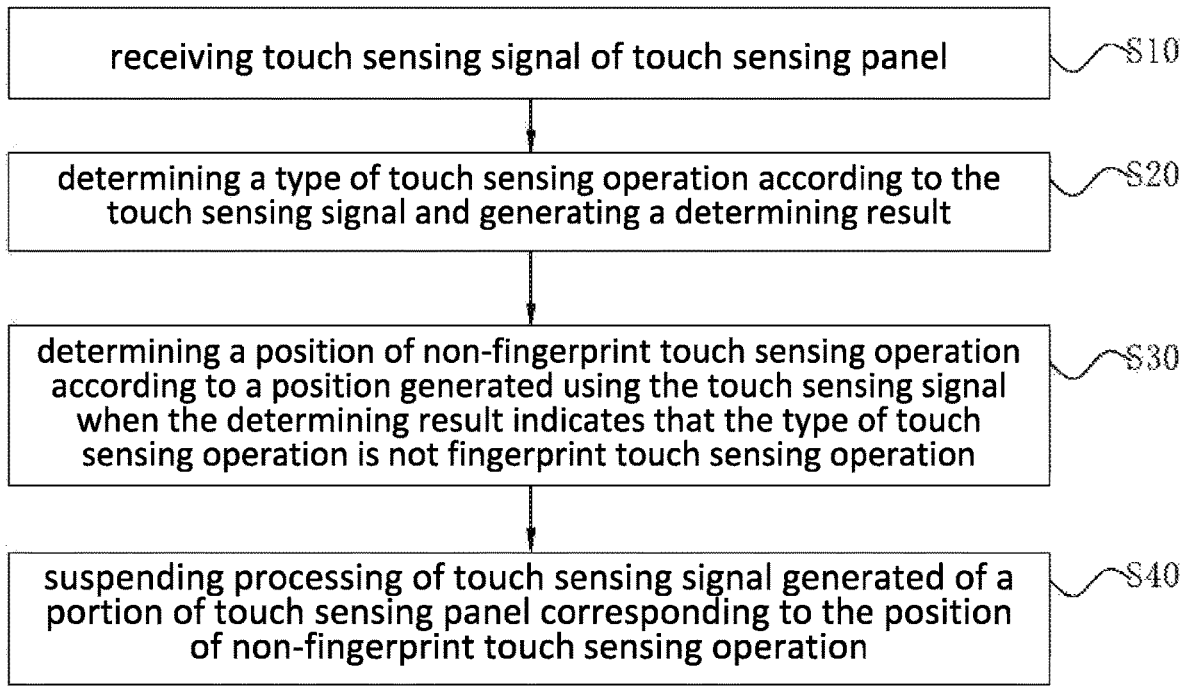
FIG. 8 is a flow chart of a touch sensing method of the present disclosure.

FIG. 8 illustrates a touch sensing method, the touch sensing method included following steps.

step of S10: receiving a touch sensing signal of a touch sensing panel;

step of S20: determining a type of a touch sensing operation according to the touch sensing signal and generating a determining result;

step of S30: determining a position of a non-fingerprint touch sensing operation according to a position generated using the touch sensing signal when the determining result indicates that the type of the touch sensing operation is not a fingerprint touch sensing operation; and step of S40: suspending processing of the touch sensing signal generated of a portion of the touch sensing panel corresponding to the position of the non-fingerprint touch sensing operation.

According to this embodiment of the present invention, after the step of S20, the touch sensing method further includes following steps.

step of S50: obtaining a position coordinate of the touch sensing operation when the determining result indicates that the type of the touch sensing operation is a fingerprint touch sensing operation; and step of S60: driving touch sensing electrodes corresponding to the position coordinate.

According to this embodiment of the present invention, the step of S40 includes following steps.

step: stopping driving of at least a column of first touch sensing electrodes corresponding to a boundary area when the position of non-fingerprint touch sensing operation is located at a left boundary or/and a right boundary of the touch sensing panel; and step: stopping driving of at least a row of second touch sensing electrodes corresponding to the boundary area when the position of non-fingerprint touch sensing operation is located at an upper boundary or/and a bottom boundary of the touch sensing panel.

According to this embodiment of the present invention, the step of S40 further includes following step.

step: stopping driving of third touch sensing electrodes of an irregular area corresponding to the position of non-fingerprint touch sensing operation.

According to another embodiment of the present invention, the step of S40 includes following steps.

step: processing a first touch sensing signal of the at least a column of first touch sensing electrodes corresponding to the boundary area as a touch sensing signal of the first touch sensing electrodes generated using a non-touching condition thereof when the position of non-fingerprint touch sensing operation is located at the left boundary or/and the right boundary of the touch sensing panel; and step: processing a second touch sensing signal of the at least a row of second touch sensing electrodes corresponding to the boundary area as a touch sensing signal of the second touch sensing electrodes generated using a non-touching condition thereof when the position of non-fingerprint touch sensing operation is located at the upper boundary or/and the bottom boundary of the touch sensing panel.

According to this embodiment of the present invention, the step of S40 further includes following step.

step: processing a third touch sensing signal of the third touch sensing electrodes of the irregular area corresponding to the position of non-fingerprint touch sensing operation as a touch sensing signal of the third touch sensing electrodes generated using a non-touching operation thereof.

In this embodiment of the present invention, the internal data of the driving device 110 is modified to equivalent to non-touching operation of at least a column of the first touch sensing electrodes corresponding to the boundaries.

The present disclosure has the following advantages. When false manipulations are detected according to the detection of fingerprint recognition inside the touch sensing panel, the driving of touch sensing panel of non-fingerprint touch sensing operation is stopped or the internal data of driving device is modified to equivalent to non-touching operation of touch sensing panel corresponding to the position of non-fingerprint touch sensing. Therefore, false manipulations can be prevented and user experience can be improved without affecting the actually manipulating effect.

The specific embodiments described herein are only for explaining the present disclosure. It should be noted that various changes and modifications can be made to the invention in light of the above detailed description by those skilled in the art, and those various changes and modifications should be considered to be pertained to the scope of the present invention.

What is claimed is:

1. A touch sensing method, comprising steps of:
    step of S10: receiving a touch sensing signal of a touch sensing panel;
    step of S20: determining a type of a touch sensing operation according to the touch sensing signal and generating a determining result;
    step of S30: determining a position of a non-fingerprint touch sensing operation according to a position generated using the touch sensing signal when the determining result indicates that the type of the touch sensing operation is not a fingerprint touch sensing operation; and
    step of S40: suspending processing of the touch sensing signal generated of a portion of the touch sensing panel corresponding to the position of the non-fingerprint touch sensing operation.

2. The touch sensing method according to claim 1, wherein the step of S40 comprises steps of:
    step of S41: stopping driving of at least a column of first touch sensing electrodes corresponding to a boundary area when the position of non-fingerprint touch sensing operation is located at a left boundary or/and a right boundary of the touch sensing panel; and
    step of S42: stopping driving of at least a row of second touch sensing electrodes corresponding to the boundary area when the position of non-fingerprint touch sensing operation is located at an upper boundary or/and a bottom boundary of the touch sensing panel.

3. The touch sensing method according to claim 1, wherein the step of S40 comprises steps of:
    step of S41: processing a first touch sensing signal of the at least a column of first touch sensing electrodes corresponding to the boundary area as a touch sensing signal of the first touch sensing electrodes generated using a non-touching condition thereof when the position of non-fingerprint touch sensing operation is located at the left boundary or/and the right boundary of the touch sensing panel; and
    step of S42: processing a second touch sensing signal of the at least a row of second touch sensing electrodes corresponding to the boundary area as a touch sensing signal of the second touch sensing electrodes generated using a non-touching condition thereof when the position of non-fingerprint touch sensing operation is located at the upper boundary or/and the bottom boundary of the touch sensing panel.

4. The touch sensing method according to claim 1, wherein the step of S40 comprises steps of:
    step of S41: stopping driving of third touch sensing electrodes of an irregular area corresponding to the position of non-fingerprint touch sensing operation; and
    step of S42: processing a third touch sensing signal of the third touch sensing electrodes of the irregular area corresponding to the position of non-fingerprint touch sensing operation as a touch sensing signal of the third touch sensing electrodes generated using a non-touching operation thereof.

5. The touch sensing method according to claim 1, wherein after the step of S20, the touch sensing method further comprises steps of:
    step of S50: obtaining a position coordinate of the touch sensing operation when the determining result indicates that the type of the touch sensing operation is a fingerprint touch sensing operation; and
    step of S60: driving touch sensing electrodes corresponding to the position coordinate.

6. A touch sensing apparatus, comprising:
    a receiving device configured to receive a touch sensing signal of a touch sensing panel;
    a determining device configured to determine a type of a touch sensing operation and generate a determining result;
    a locating device configured to recognize a position of a non-fingerprint touch sensing operation according to a position generated using the touch sensing signal when the determining result indicates that the type of the touch sensing operation is not a fingerprint touch sensing operation; and a driving device configured to suspend processing of the touch sensing signal generated of a portion of the touch sensing panel corresponding to the position of the non-fingerprint touch sensing operation.

7. The touch sensing apparatus according to claim 6, wherein the driving device is further configured to:
   stop driving of at least a column of first touch sensing electrodes corresponding to a boundary area when the position of the non-fingerprint touch sensing operation is located at a left boundary or/and a right boundary of the touch sensing panel; or
   stop driving of at least a row of second touch sensing electrodes corresponding to the boundary area when the position of the non-fingerprint touch sensing operation is located at an upper boundary or/and a bottom boundary of the touch sensing panel.

8. The touch sensing apparatus according to claim 6, wherein the driving device is further configured to:
   process a first touch sensing signal of the at least a column of first touch sensing electrodes corresponding to the boundary area as a touch sensing signal of the first touch sensing electrodes generated using a non-touching condition thereof when the position of the non-fingerprint touch sensing operation is located at the left boundary or/and the right boundary of the touch sensing panel; or
   process a second touch sensing signal of the at least a row of second touch sensing electrodes corresponding to the boundary area as a touch sensing signal of the second touch sensing electrodes generated using the non-touching condition thereof when the position of non-fingerprint touch sensing operation is located at the upper boundary or/and the bottom boundary of the touch sensing panel.

9. The touch sensing apparatus according to claim 6, wherein the driving device is further configured to:
   stop driving of third touch sensing electrodes of an irregular area corresponding to the position of non-fingerprint touch sensing operation; or
   process a third touch sensing signal of the third touch sensing electrodes of the irregular area corresponding to the position of non-fingerprint touch sensing operation as a touch sensing signal of the third touch sensing electrodes generated using a non-touching operation thereof.

10. The touch sensing apparatus according to claim 6, wherein the locating device is further configured to obtain a position coordinate of the touch sensing operation when the determining result indicates that the type of the touch sensing operation is a fingerprint touch sensing operation; and
   drive touch sensing electrodes corresponding to the position coordinate using the driving device.

* * * * *